United States Patent
Wang et al.

(10) Patent No.: US 9,130,938 B2
(45) Date of Patent: Sep. 8, 2015

(54) METHOD, SWITCH, AND SYSTEM FOR PROCESSING A MESSAGE

(75) Inventors: Jianbing Wang, Nanjing (CN); Wenyi Liang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 13/614,712

(22) Filed: Sep. 13, 2012

(65) Prior Publication Data
US 2013/0297825 A1 Nov. 7, 2013

(30) Foreign Application Priority Data
Feb. 14, 2012 (CN) .......................... 2012 1 0032665

(51) Int. Cl.
*H04L 29/12* (2006.01)
*G06F 15/16* (2006.01)

(52) U.S. Cl.
CPC ............ *H04L 61/10* (2013.01); *H04L 61/6009* (2013.01); *H04L 61/6013* (2013.01); *H04L 61/6022* (2013.01); *H04L 61/2015* (2013.01)

(58) Field of Classification Search
CPC ..................................................... H04L 61/10
USPC ........................................................ 709/245
See application file for complete search history.

(56) References Cited

U.S. PATENT DOCUMENTS

2007/0121617 A1   5/2007   Kanekar et al.

FOREIGN PATENT DOCUMENTS

CN       1658569 A       8/2005
WO    WO 2012/006170 A2    1/2012

OTHER PUBLICATIONS

Shah, et al, "ARP Broadcast Reduction for Large Data Centers", Oct. 28, 2011, http://tools.ietf.org/html/draft-shah-armd-arp-reduction-02.*
Joshi, et al., "Antispoofing Information Lost and Regained", IEEE 2011.*
Extended European Search Report issued in corresponding European Patent Application No. 12184401.3, mailed Mar. 19, 2013.
Elmeleegy et al., "EtherProxy: Scaling Ethernet by Suppressing Broadcast Traffic" IEEE 2009.

(Continued)

*Primary Examiner* — Suraj Joshi
(74) *Attorney, Agent, or Firm* — Huawei Technologies Co., Ltd.

(57) ABSTRACT

Embodiments of the present invention provide a method, a switch, and a system for processing a message, which relate to the field of communications technologies, and are used to improve real-time performance in ARP request processing when APR request flooding occurs. An access switch generates a mapping table in a communication process between an intra-group server and a DHCP server, where the mapping table includes mapping between the intra-group server and address information of the intra-group server; receives an ARP request sent by a source server, where the ARP request is used to indicate a destination server that the source server needs to access; searches the mapping table according to the ARP request, and when the address information of the destination server is obtained according to the mapping table, sends the address information of the destination server to the source server.

14 Claims, 5 Drawing Sheets

(56) References Cited

OTHER PUBLICATIONS

Joshi et al., "Antispoofing Information Lost and Regained" IEEE 2011.

Shah et al., "ARP Broadcast Reduction for Large Data Centers" Working Group ARMD, Oct. 28, 2011.

Walraed-Sullivan et al., "ALIAS: Scalable, Decentralized Label Assignment for Data Centers" SOCC, Cascais, Portugal. Oct. 27-28, 2011.

* cited by examiner

METHOD, SWITCH, AND SYSTEM FOR PROCESSING A MESSAGE

CROSS-REFERENCE TO RELATED APPLICATION

This application claims priority to Chinese Patent Application No. 201210032665.1, filed on Feb. 14, 2012, which is hereby incorporated by reference in its entirety.

FIELD OF THE INVENTION

The present invention relates to the field of communications technologies, and in particular, to a method, a switch, and a system for processing a message.

BACKGROUND OF THE INVENTION

A fat tree architecture is an important deployment scheme of a data center (DC) network. A typical network topology of the fat tree architecture includes switches of an access layer, switches of a convergence layer and servers. Each switch of the access layer is interconnected with each switch of the convergence layer.

Taking a medium-sized fat tree architecture as an example, the architecture has 3000 to 5000 servers. When a server needs to access another server in the architecture, an ARP (Address Resolution Protocol) request sent by a VM (Virtual Machine,) in the server is broadcast to all the other servers and switches in the architecture. Therefore, if a lot of VMs send ARP requests, an ARP request flooding may occur, thereby consuming network bandwidth, and occupying CPU resources of the switches in the convergence layer and servers. Therefore, how to solve an ARP request flooding problem is a key of the fat tree architecture.

In the prior art, the ARP request flooding problem may be solved through an ARP proxy server. However, when the ARP proxy server dynamically acquires an IP address from a DHCP (Dynamic Host Configuration Protocol) server, after obtaining the ARP request sent by the VM, the ARP proxy server needs to communicate with the DHCP server frequently so as to obtain the IP address of an accessed server, and therefore, the ARP proxy server fails to respond to the ARP request in time, resulting in poor real-time performance.

SUMMARY OF THE INVENTION

Embodiments of the present invention provide a method, a switch, and a system for processing a message, which are used to improve real-time performance in ARP request processing when APR request flooding occurs.

Embodiments of the present invention adopt the following solutions.

According to a first aspect of the present invention, a method for processing a message is provided, the method includes:

generating a mapping table in a communication process between an intra-group server and a dynamic host configuration protocol (DHCP) server, where the mapping table includes mapping between the intra-group server and address information of the intra-group server;

receiving an address resolution protocol (ARP) request sent by a source server, where the ARP request is used to indicate a destination server that the source server needs to access; and searching the mapping table according to the ARP request, and when address information of the destination server is obtained according to the mapping table, sending the address information of the destination server to the source server.

According to a second aspect of the present invention, a switch is provided, the switch includes:

an information acquisition unit, configured to generate a mapping table in a communication process between an intra-group server and a dynamic host configuration protocol DHCP (server), where the mapping table includes mapping between the intra-group server and address information of the intra-group server;

a request receiving unit, configured to receive an address resolution protocol (ARP) request sent by a source server, where the ARP request is used to indicate a destination server that the source server needs to access; and an information sending unit, configured to search the mapping table according to the ARP request, and when address information of the destination server is obtained according to the mapping table, send the address information of the destination server to the source server.

According to a third aspect of the present invention, a system for processing a message is provided, the system includes: a source server and an access switch, where the source server is configured to send an ARP request to the access switch, where the ARP request is used to indicate a destination server that the source server needs to access; and receive address information of the destination server from the access switch; and the access switch is configured to generate a first mapping table in a communication process between an intra-group server and a dynamic host configuration protocol (DHCP) server, where the first mapping table includes mapping between the intra-group server and address information of the intra-group server; receive the ARP request sent by the source server; search the first mapping table according to the ARP request, and when the address information of the destination server is obtained according to the first mapping table, send the address information of the destination server to the source server.

In the method, the switch, and the system for processing a message provided by the embodiments of the present invention, when an intra-group server dynamically acquires the address information from the DHCP server, by using the embodiments of the present invention, the access switch may acquire mapping between the intra-group server and the address information of the intra-group server and store the mapping in the mapping table in the communication process between the intra-group server and the DHCP server. Therefore, when the access switch receives the address resolution protocol request of the source server and the address information of the destination server is obtained according to the mapping table, the access switch may send the address information of the destination server to the source server according to the stored mapping table, and does not need to frequently communicate with the DHCP server to acquire the address information of the destination server. Therefore, when APR request flooding occurs, by using the embodiments of the present invention, response to the request of the source server is still in time, thereby improving real-time performance in ARP request processing.

BRIEF DESCRIPTION OF THE DRAWINGS

To illustrate the solutions in the embodiments of the present invention or in the prior art more clearly, the following briefly describes the accompanying drawings needed for describing the embodiments or the prior art. Apparently, the accompanying drawings in the following description merely

DETAILED DESCRIPTION OF THE EMBODIMENTS

The following clearly describes the solutions in the embodiments of the present invention with reference to the accompanying drawings in the embodiments of the present invention. Apparently, the described embodiments are a part rather than all of the embodiments of the present invention. All other embodiments, which may be derived by persons skilled in the art from the embodiments of the present invention without creative efforts, shall fall within the protection scope of the present invention.

Figure 1:
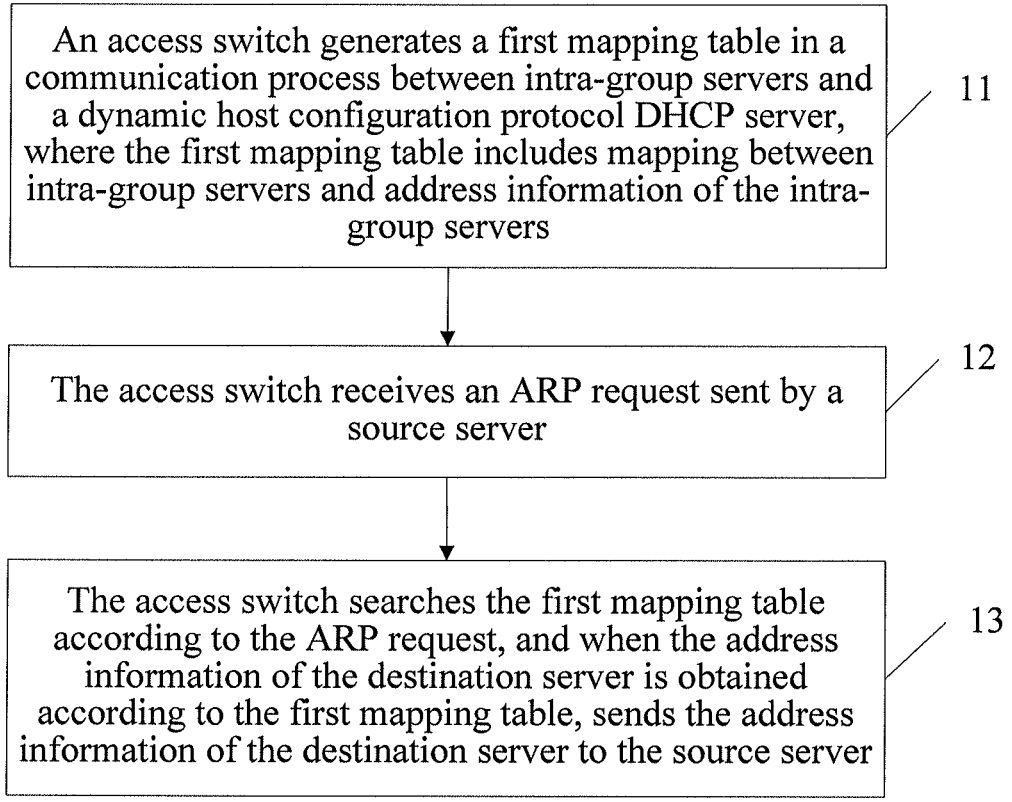
FIG. 1 is a flow chart of a method for processing a message according to Embodiment 1 of the present invention.

As shown in FIG. 1, a method for processing a message according to Embodiment 1 of the present invention includes the following steps.

Step 11: An access switch (Top of rack switch, TOR) generates a first mapping table in a communication process between intra-group servers and a dynamic host configuration protocol (DHCP) server, where the first mapping table includes mapping between intra-group servers and address information of the intra-group servers.

According to an existing fat tree architecture, each core switch (COR LSW) is connected to each access switch in the architecture, and each access switch may be connected to multiple servers. The intra-group servers refer to servers connected to the access switch. The address information here refers to an IP address and an MAC (Media Access Control, media access control) address of an intra-group server.

Taking an access switch A as an example, it is assumed that the intra-group servers of the access switch A include ten servers in total, namely, server 1 to server 10.

When each intra-group server needs to be connected to the network, the intra-group server needs to communicate with the DHCP server so as to acquire address information of the intra-group server. Therefore, in a communication process between the intra-group server and the DHCP server, the access switch may intercept a packet between the intra-group server and the DHCP server, and acquire the address information of the intra-group server. Then, mapping between the intra-group server and the address information of the intra-group server may be stored in the first mapping table.

Step 12: The access switch receives an ARP request sent by a source server, where the ARP request is used to indicate a destination server that the source server needs to access.

The source server refers to a server that initiates the ARP request, and may be any server in the network architecture. The destination server refers to a server that the source server expects to access, and may also be any server in the network architecture.

Step 13: The access switch searches the first mapping table according to the ARP request, and when address information of the destination server is obtained according to the first mapping table, sends the address information of the destination server to the source server.

After receiving the ARP request, the access switch may search the first mapping table according to the ARP request. When the address information of the destination server is obtained according to the first mapping table, the address information of the destination server is sent to the source server.

Still, the access switch A is taken as an example. The first mapping table of the access switch A stores mapping between the intra-group servers of the access switch A, namely the server 1 to server 10, and respective address information of the intra-group servers. Therefore, when a source server expects to access an intra-group server of the source server, for example, the server 1, the access switch A searches the first mapping table after receiving the ARP request broadcast by the source server, and then sends address information of the server 1 to the source server.

When the intra-group server dynamically acquires the address information from the DHCP server, by using the embodiment of the present invention, the access switch may acquire mapping between the intra-group server and the address information of the intra-group server and store the mapping in the mapping table in the communication process between the intra-group server and the DHCP server. Therefore, when the access switch receives the address resolution protocol request of the source server and the address information of the destination server is obtained according to the mapping table, the access switch may send the address information of the destination server to the source server according to the stored mapping table, and does not need to frequently communicate with the DHCP server to acquire the address information of the destination server. Therefore, when APR request flooding occurs, by using the embodiment of the present invention, response to the request of the source server is still in time, thereby improving real-time performance in ARP request processing.

Corresponding to Embodiment 1 of the present invention, at a core switch side, Embodiment 2 of the present invention further provides a method for processing a message.

Figure 2:
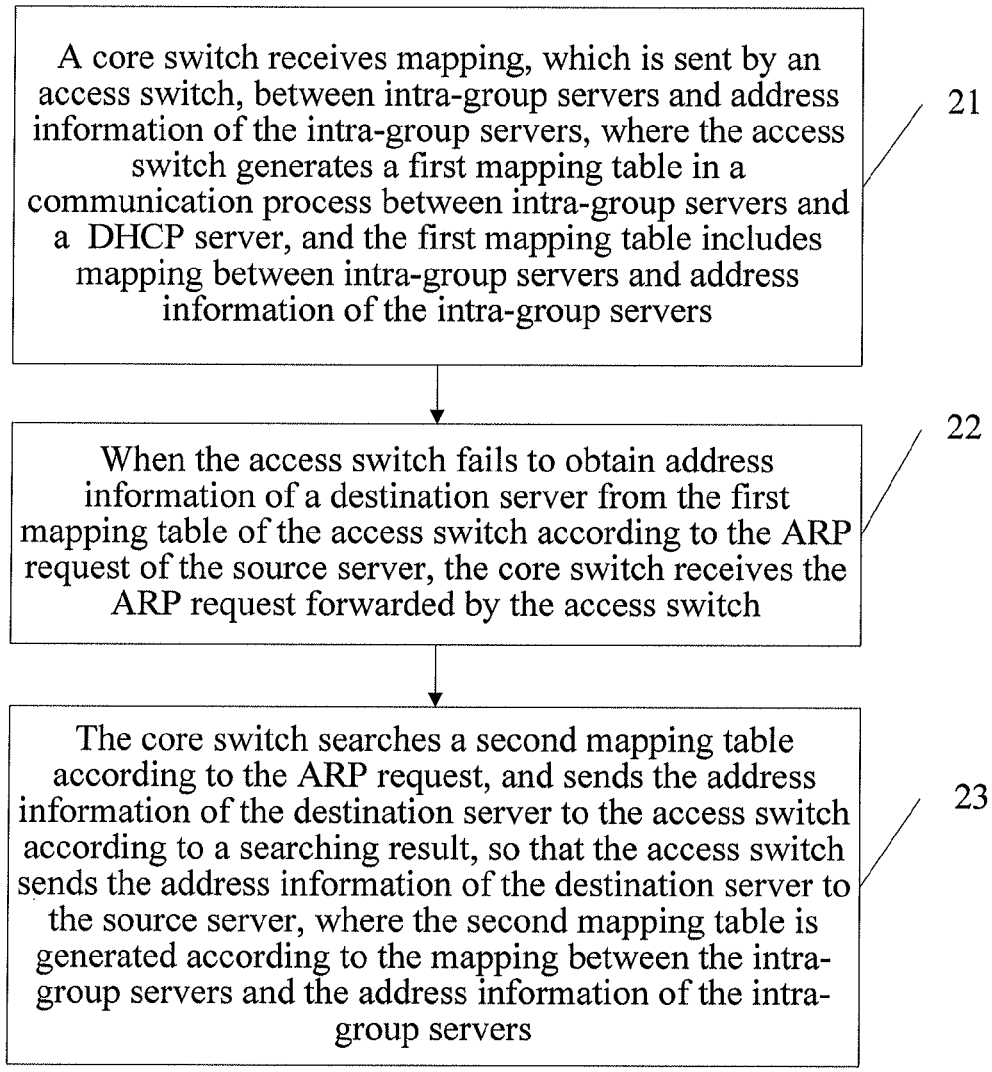
FIG. 2 is a flow chart of a method for processing a message according to Embodiment 2 of the present invention.

As shown in FIG. 2, a method for processing a message according to Embodiment 2 of the present invention includes the following steps.

Step 21: A core switch receives mapping, which is sent by an access switch, between intra-group servers and address information of the intra-group servers, where the access switch generates a first mapping table in a communication process between intra-group servers and a dynamic host configuration protocol (DHCP) server, and the first mapping table includes mapping between intra-group servers and address information of the intra-group servers.

According to the description of the foregoing embodiment, the access switch generates the first mapping table in the communication process between the intra-group servers and the dynamic host configuration protocol (DHCP) server, where the first mapping table includes mapping between intra-group servers and address information of the intra-group servers. Therefore, when a state of the first mapping table changes, for example, mapping between an intra-group server and address information of the intra-group server is added, or mapping between an intra-group server and address information of the intra-group server is deleted, or mapping between an intra-group server and address information of the intra-group server is modified, the access switch may send changed mapping between the intra-group server and the address information of the intra-group server to the core switch. Therefore, the core switch may generate a second mapping table according to the mapping between the intra-group servers and address information of the intra-group servers.

Step 22: When the access switch fails to obtain address information of a destination server from the first mapping table of the access switch according to an ARP request of a source server, the core switch receives the ARP request forwarded by the access switch.

Still, the foregoing access switch A is taken as an example. The first mapping table of the access switch A only includes mapping between the intra-group servers of the access switch A and respective address information of the intra-group servers, and meanwhile, the ARP request of each intra-group server is broadcast to all the access switches. Therefore, the access switch A may receive an ARP request not broadcast by the intra-group servers of the access switch A. At this time, the access switch A fails to obtain the address information of the destination server according to the first mapping table of the access switch A. Therefore, the access switch A needs to forward the ARP request to the core switch, so as to obtain the address information of the destination server from the core switch.

Step 23: The core switch searches a second mapping table according to the ARP request, and sends the address information of the destination server to the access switch according to a searching result, so that the access switch sends the address information of the destination server to the source server, where the second mapping table is generated according to the mapping between the intra-group servers and the address information of the intra-group servers.

When the intra-group server dynamically acquires the address information from the DHCP server, by using the embodiment of the present invention, the access switch may acquire mapping between the intra-group server and the address information of the intra-group server and store the mapping in the mapping table in the communication process between the intra-group server and the DHCP server. Therefore, when the access switch receives the address resolution protocol request of the source server and the address information of the destination server is obtained according to the mapping table, the access switch may send the address information of the destination server to the source server according to the stored mapping table, and does not need to frequently communicate with the DHCP server to acquire the address information of the destination server. Therefore, when APR request flooding occurs, by using the embodiment of the present invention, response to the request of the source server is still in time, thereby improving real-time performance in ARP request processing.

Figure 3:
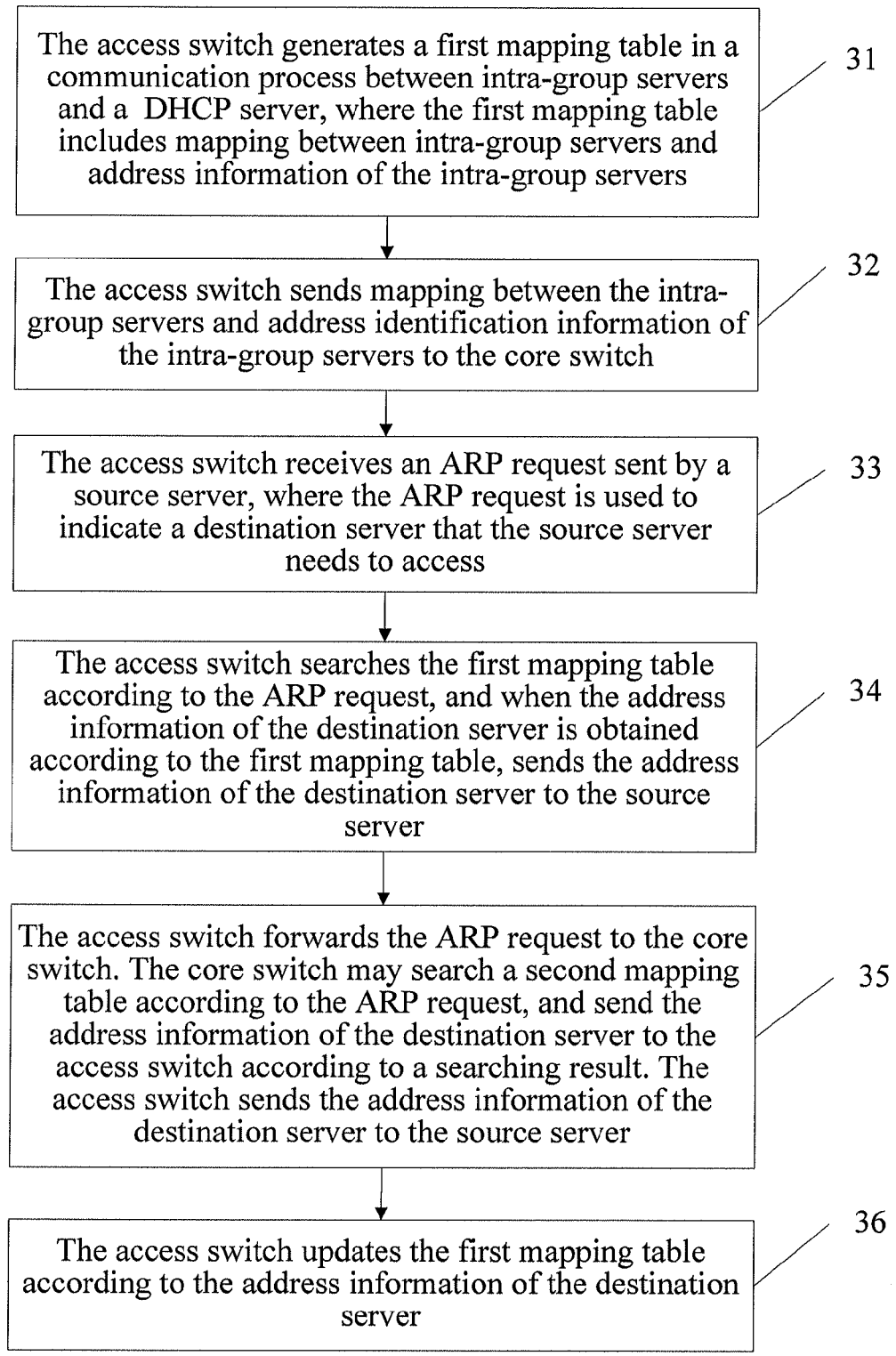
FIG. 3 is a flow chart of a method for processing a message according to Embodiment 3 of the present invention.

The implementation process of a method for processing a message in the embodiment of the present invention is described in detail below with reference to Embodiment 3 in combination with the contents of the foregoing two embodiments. As shown in FIG. 3, a method for processing a message according to Embodiment 3 of the present invention includes:

Step 31: An access switch generates a first mapping table in a communication process between intra-group servers and a dynamic host configuration protocol (DHCP) server, where the first mapping table includes mapping between intra-group servers and address information of the intra-group servers.

For step 31, reference may be made to the description of step 11 in Embodiment 1.

Step 32: The access switch sends mapping between the intra-group servers and address identification information of the intra-group servers to a core switch.

The core switch is connected to each access switch. Therefore, the mapping, which is sent by each access switch, between the intra-group servers and the address information of the intra-group servers is stored in the core switch. Therefore, it is ensured that the core switch provides address information of a destination server for a source server successfully.

At the same time, information of a connection between an interface of the core switch and a virtual machine is stored in the core switch.

Step 33: The access switch receives an ARP request sent by a source server, where the ARP request is used to indicate a destination server that the source server needs to access.

For step 33, reference may be made to the description of step 12 in Embodiment 1.

Step 34: The access switch searches the first mapping table according to the ARP request, and when the address information of the destination server is obtained according to the first mapping table, sends the address information of the destination server to the source server.

After receiving the ARP request, the access switch may search the first mapping table according to the ARP request. When the address information of the destination server is obtained according to the first mapping table, the address information of the destination server is sent to the source server. If the access switch fails to obtain the address information of the destination server according to the mapping of the access switch, step 35 is performed.

Step 35: The access switch forwards the ARP request to the core switch. The core switch may search a second mapping table according to the ARP request, and send the address information of the destination server to the access switch according to a searching result. The access switch sends the address information of the destination server to the source server.

Step 36: The access switch updates the first mapping table according to the address information of the destination server.

In addition, when a virtual machine migrates, the access switch notifies the core switch that the core switch updates the information of the connection between the interface of the core switch and the virtual machine, where the information is stored in the core switch.

It may be seen from the method according to Embodiment 3 of the present invention that, when APR request flooding occurs, the access switch is not only capable of satisfying the request of the source server in time, thereby improving real-time performance in ARP request processing, but also capable of ensuring that the access switch provides the address information of the destination server for the source server successfully.

Figure 4:
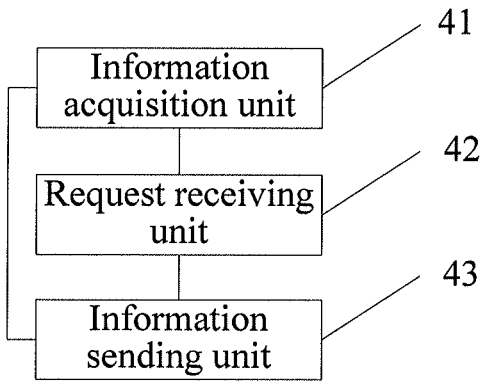
FIG. 4 is a structural diagram of a switch according to Embodiment 4 of the present invention.

As shown in FIG. 4, a switch according to Embodiment 4 of the present invention includes:

an information acquisition unit 41, configured to generate a first mapping table in a communication process between intra-group servers and a dynamic host configuration protocol (DHCP) server, where the first mapping table includes mapping between intra-group servers and address information of the intra-group servers; a request receiving unit 42, configured to receive an address resolution protocol (ARP) request sent by a source server, where the ARP request is used to indicate a destination server that the source server needs to access; an information sending unit 43, configured to search the first mapping table according to the ARP request, and when address information of the destination server is obtained according to the first mapping table, send the address information of the destination server to the source server.

The information acquisition unit 41 includes: an acquisition module, configured to acquire the address information of the intra-group server in a manner of intercepting a packet between the intra-group server and the DHCP server; and a processing module, configured to add mapping between the intra-group server and the address information of the intra-group server into the first mapping table.

For a working principle of the switch according to Embodiment 4 of the present invention, reference may be made to the description of each foregoing method embodiment.

When the intra-group server dynamically acquires the address information from the DHCP server, by using the embodiment of the present invention, the access switch may acquire mapping between the intra-group server and the address information of the intra-group server and store the mapping in the mapping table in the communication process between the intra-group server and the DHCP server. Therefore, when the access switch receives the address resolution protocol request of the source server and the address information of the destination server is obtained according to the mapping table, the access switch may send the address information of the destination server to the source server according to the stored mapping table, and does not need to frequently communicate with the DHCP server to acquire the address information of the destination server. Therefore, when APR request flooding occurs, by using the embodiment of the present invention, response to the request of the source server is still in time, thereby improving real-time performance in ARP request processing.

In addition, in order to ensure that the address information of the destination server is provided for the source server successfully, the information sending unit 43 is further configured to send mapping between the intra-group servers and address identification information of the intra-group servers to a core switch. The information acquisition unit 41 is further configured to: when the address information of the destination server cannot be obtained according to the first mapping table, obtain the address information of the destination server from the core switch, and send the address information of the destination server to the information sending unit. Then, the information sending unit 43 sends the address information of the destination server to the source server.

Figure 5:
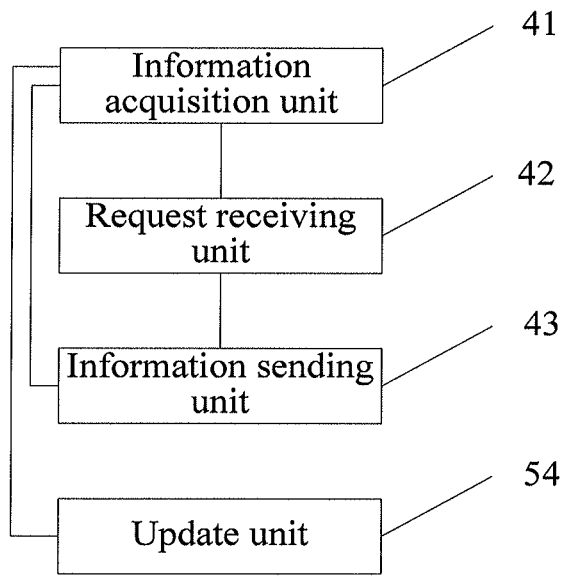
FIG. 5 is a schematic diagram of a switch according to Embodiment 4 of the present invention.

At this time, as shown in FIG. 5, the switch further includes: an update unit 54, configured to update the first mapping table according to the address information of the destination server.

It may be seen from the switch according to Embodiment 4 of the present invention that, when APR request flooding occurs, the switch is not only capable of satisfying the request of the source server in time, thereby improving real-time performance in ARP request processing, but also capable of ensuring that the address information of the destination server is provided for the source server successfully.

The switch according to Embodiment 4 of the present invention may be applied in the access switch.

Figure 6:
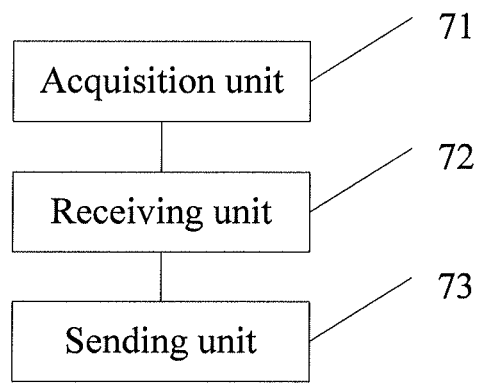
FIG. 6 is a structural diagram of a switch according to Embodiment 5 of the present invention.

As shown in FIG. 6, a switch according to Embodiment 5 of the present invention includes:

an acquisition unit 71, configured to receive mapping, which is sent by an access switch, between intra-group servers and address information of the intra-group servers, where the access switch generates a first mapping table in a communication process between intra-group servers and a dynamic host configuration protocol (DHCP) server, and the first mapping table includes mapping between intra-group servers and address information of the intra-group servers;

a receiving unit 72, configured to: when the access switch fails to obtain address information of a destination server from the first mapping table according to an ARP request of a source server, receive the ARP request forwarded by the access switch; and a sending unit 73, configured to search a second mapping table according to the ARP request, and send the address information of the destination server to the access switch according to a searching result, so that the access switch sends the address information of the destination server to the source server, where the second mapping table is generated according to the mapping between the intra-group servers and the address information of the intra-group servers.

When the intra-group server dynamically acquires the address information from the DHCP server, by using the embodiment of the present invention, the access switch may acquire mapping between the intra-group server and the address information of the intra-group server and store the mapping in the mapping table in the communication process between the intra-group server and the DHCP server. Therefore, when the access switch receives the address resolution protocol request of the source server and the address information of the destination server is obtained according to the mapping table, the access switch may send the address information of the destination server to the source server according to the stored mapping table, and does not need to frequently communicate with the DHCP server to acquire the address information of the destination server. Therefore, when APR request flooding occurs, by using the embodiment of the present invention, response to the request of the source server is still in time, thereby improving real-time performance of ARP request processing.

For a working principle of the switch according to Embodiment 5 of the present invention, reference may be made to the description of foregoing method embodiment, and the switch according to Embodiment 5 may be applied in the core switch.

Figure 7:
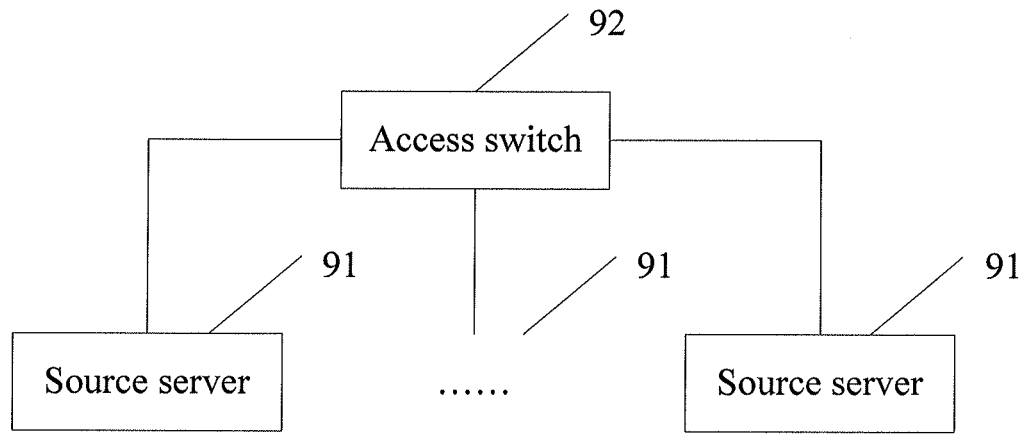
FIG. 7 is a schematic diagram of a system for processing a message according to Embodiment 6 of the present invention.

In addition, Embodiment 6 of the present invention further provides a system for processing a message. As shown in FIG. 7, the system includes:

a source server 91, configured to send an ARP request to an access switch, where the ARP request is used to indicate a destination server that the source server needs to access; and receive address information of the destination server; and an access switch 92, including the switch in FIG. 4 or FIG. 5 of the embodiment, and configured to generate a first mapping table in a communication process between intra-group servers and a dynamic host configuration protocol (DHCP) server, where the first mapping table includes mapping between intra-group servers and address information of the intra-group servers; receive the address resolution protocol (ARP) request sent by the source server, where the ARP request is used to indicate the destination server that the source server needs to access; search the first mapping table according to the ARP request, and when the address information of the destination server is obtained according to the first mapping table, send the address information of the destination server to the source server.

Figure 8:
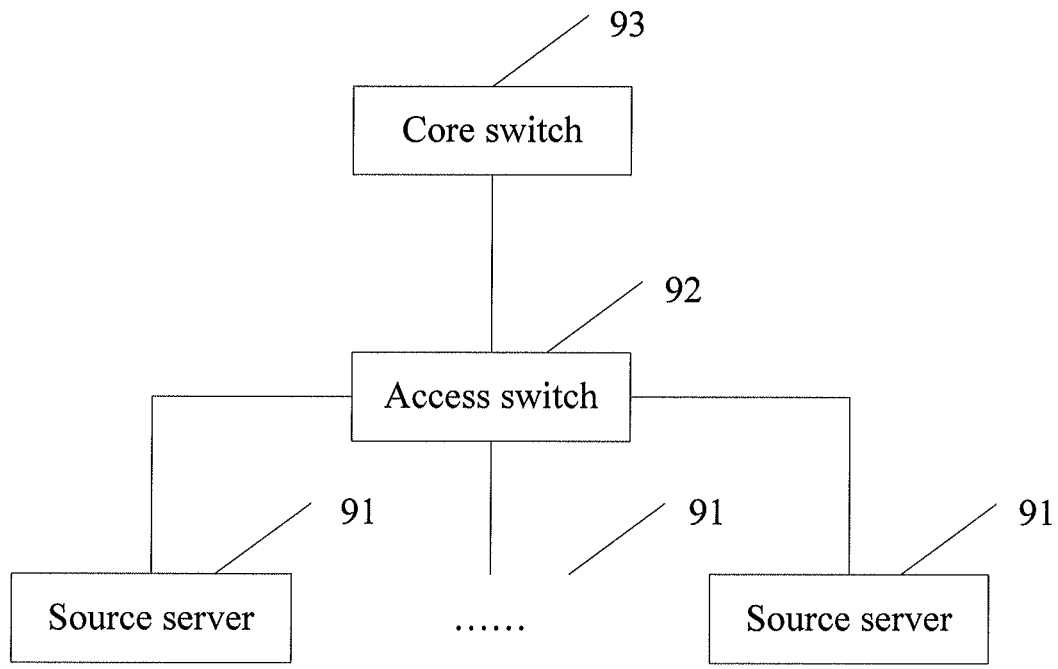
FIG. 8 is a detailed schematic diagram of a system for processing a message according to Embodiment 6 of the present invention.

In addition, in order to ensure that the address information of the destination server is provided for the source server successfully, as shown in FIG. 8, the system further includes: a core switch 93, including the switch described in FIG. 6, and configured to receive the mapping, which is sent by the access switch, between the intra-group servers and the address information of the intra-group servers, where the access switch generates the first mapping table in the communication process between the intra-group servers and the dynamic host configuration protocol (DHCP) server and the first mapping table includes the mapping between the intra-group servers and the address information of the intra-group servers, when the access switch fails to obtain the address information of the destination server from the first mapping table according to the ARP request of the source server, receive the ARP request forwarded by the access switch; search a second mapping table according to the ARP request, and send the address information of the destination server to the access switch according to a searching result, so that the access switch sends the address information of the destination server to the source server. The second mapping table is generated according to the mapping between the intra-group servers and the address information of the intra-group servers.

In conclusion, in the method, the switch, and the system for processing a message provided by the embodiments of the present invention, when the intra-group server dynamically acquires the address information from the DHCP server, by using the embodiments of the present invention, the access switch may acquire mapping between the intra-group server and the address information of the intra-group server and store the mapping in the mapping table in the communication process between the intra-group server and the DHCP server. Therefore, when the access switch receives the address resolution protocol request of the source server and the address information of the destination server is obtained according to the mapping table, the access switch may send the address information of the destination server to the source server according to the stored mapping table, and does not need to frequently communicate with the DHCP server to acquire the address information of the destination server. Therefore, when APR request flooding occurs, by using the embodiments of the present invention, response to the request of the source server is still in time, thereby improving real-time performance in ARP request processing.

Persons skilled in the art should understand that all or a part of the processes of the method in the embodiments may be implemented by a computer program instructing relevant hardware. The program may be stored in a computer readable storage medium. When the program is run, the processes of the method in the embodiments are performed. The storage medium may be a magnetic disk, an optical disk, a read-only memory (Read-Only Memory, ROM), or a random access memory (Random Access Memory, RAM).

The foregoing descriptions are merely exemplary embodiments of the present invention, but not intended to limit the protection scope of the present invention. Any variation or replacement made by persons skilled in the art without departing from the technical scope of the present invention shall fall within the protection scope of the present invention. Therefore, the protection scope of the present invention shall be subject to the protection scope of the claims.

What is claimed is:

1. A method for processing a message performed by an access switch, comprising:
    generating a first mapping table in a communication process between each intra-group server of a plurality of intra-group servers and a dynamic host configuration protocol (DHCP) server, wherein the first mapping table comprises mapping between the each intra-group server and address information of the each intra-group server; wherein the intra-group servers are connected to the access switch, and the access switch is located between the intra-group servers and the DHCP server;
    receiving an address resolution protocol (ARP) request sent by a source server, wherein the ARP request indicates that the source server needs to access a destination server; and
    searching the first mapping table according to the ARP request, and
        when address information of the destination server cannot be obtained according to the first mapping table which is stored in the access switch, sending the ARP request only to a core switch connected to the access switch, wherein the ARP request is used to enable the core switch to search a second mapping table which is stored in the core switch to obtain the address information of the destination server, and the second mapping table comprises a first mapping table of each access switch that is connected to the core switch, receiving the address information of the destination server from the core switch, and sending the address information of the destination server to the source server.

2. The method according to claim 1, wherein the generating the first mapping table in the communication process between the each intra-group server and the dynamic host configuration protocol (DHCP) server comprises:
    acquiring the address information of the each intra-group server by intercepting a packet between the each intra-group server and the DHCP server; and
    adding the mapping between the each intra-group server and the address information of the each intra-group server into the first mapping table.

3. The method according to claim 2, further comprising:
    sending the mapping between the each intra-group server and address information of the each intra-group server to the core switch, wherein the mapping is used by the core switch to update the second mapping table.

4. The method according to claim 3, wherein after receiving the address information of the destination server from the core switch, the method further comprises:
    updating the first mapping table according to the address information of the destination server.

5. The method according to claim 1, further comprising:
    sending the mapping between the each intra-group server and address information of the each intra-group server to the core switch, wherein the mapping is used by the core switch to update the second mapping table.

6. An access switch implemented by computer hardware, comprising:
    an information acquisition unit, configured to generate a first mapping table in a communication process between each intra-group server of a plurality of intra-group servers and a dynamic host configuration protocol (DHCP) server, wherein the first mapping table comprises mapping between the each intra-group server and address information of the each intra-group server; wherein the intra-group servers are connected to the access switch, and the access switch is located between the intra-group servers and the DHCP server;
    a request receiving unit, configured to receive an address resolution protocol (ARP) request sent by a source server, wherein the ARP request indicates that the source server needs to access a destination server; and
    an information sending unit, configured to search the first mapping table according to the ARP request, and when address information of the destination server cannot be obtained according to the first mapping table which is stored in the access switch, send the ARP request only to a core switch connected to the access switch, wherein the ARP request is used to enable the core switch to search a second mapping table which is stored in the core switch to obtain the address information of the destination server, and the second mapping table comprises a first mapping table of each access switch that is connected to the core switch, receive the address information of the destination server from the core switch; and send the address information of the destination server to the source server.

7. The access switch according to claim 6, wherein the information acquisition unit comprises:
   an acquisition module, configured to acquire the address information of the each intra-group server by intercepting a packet between the each intra-group server and the DHCP server; and
   a processing module, configured to add the mapping between the each intra-group server and the address information of the intra-group server into the first mapping table.

8. The access switch according to claim 7, wherein the information sending unit is further configured to send the mapping between the each intra-group server and address identification information of the each intra-group server to the core switch, wherein the mapping is used by the core switch to update the second mapping table.

9. The access switch according to claim 8, further comprising:
   an update unit, configured to update the first mapping table according to the address information of the destination server after receiving the address information of the destination server from the core switch.

10. The access switch according to claim 6, wherein the information sending unit is further configured to send the mapping between the each intra-group server and address information of the each intra-group server to a core switch, wherein the mapping is used by the core switch to update the second mapping table.

11. A system for processing a message, comprising: a source server, a plurality of intra-group servers, a core switch and an access switch implemented by computer hardware, wherein
   the intra-group servers are connected to the access switch, the access switch is located between the intra-group servers and a dynamic host configuration protocol (DHCP) server, and the access switch is connected to the core switch;
   the source server is configured to send an address resolution protocol (ARP) request to the access switch, wherein the ARP request indicates that the source server needs to access a destination server; and receive address information of the destination server from the access switch;
   the access switch is configured to generate a first mapping table in a communication process between each intra-group server of the plurality of intra-group servers and the DHCP server, wherein the first mapping table comprises mapping between the each intra-group server and address information of the each intra-group server; receive the ARP request sent by the source server; search the first mapping table according to the ARP request, and when address information of the destination server cannot be obtained according to the first mapping table which is stored in the access switch, send the ARP request only to a core switch connected to the access switch, receive the address information of the destination server from the core switch, and send the address information of the destination server to the source server; and
   the core switch is configured to receive the ARP request forwarded by the access switch, search a second mapping table which is stored in the core switch according to the ARP request to obtain the address information of the destination server, and send the address information of the destination server to the access switch, wherein the second mapping table comprises a first mapping table of each access switch that is connected to the core switch.

12. The system according to claim 11, wherein:
   the core switch is further configured to receive the mapping, which is sent by the access switch, between the each intra-group server and address information of the each intra-group server, and update the second mapping table according to the mapping.

13. The system according to claim 11, wherein the access switch is configured to acquire the address information of the each intra-group server by intercepting a packet between the each intra-group server and the DHCP server; and add the mapping between the each intra-group server and address information of the each intra-group server into the first mapping table.

14. The system according to claim 11, wherein after the sending the address information of the destination server to the source server, the access switch is further configured to update the first mapping table according to the address information of the destination server which is sent by the core switch.

* * * * *